US011479065B2

(12) United States Patent
Dickson et al.

(10) Patent No.: US 11,479,065 B2
(45) Date of Patent: Oct. 25, 2022

(54) POSITION SENSING SYSTEM AND METHOD FOR LOCATING TIRE PRESSURE MONITORING SENSORS USING CORRELATION TO WHEEL END SENSORS

(71) Applicant: Sensata Technologies, Inc., Attleboro, MA (US)

(72) Inventors: Kevin G. Dickson, Ballindery (GB); Gary A. Graham, Mallusk (GB)

(73) Assignee: Sensata Technolgies, Inc., Attleboro, MA (US)

( * ) Notice: Subject to any disclaimer, the term of this patent is extended or adjusted under 35 U.S.C. 154(b) by 518 days.

(21) Appl. No.: 16/571,513

(22) Filed: Sep. 16, 2019

(65) Prior Publication Data

US 2021/0078371 A1    Mar. 18, 2021

(51) Int. Cl.
*B60C 23/04*    (2006.01)
*G07C 5/08*    (2006.01)

(52) U.S. Cl.
CPC ...... *B60C 23/0489* (2013.01); *B60C 23/0401* (2013.01); *B60C 23/0422* (2013.01); *B60C 23/0474* (2013.01); *G07C 5/0825* (2013.01)

(58) Field of Classification Search
CPC ............ B60C 23/0408; B60C 23/0494; B60C 23/0496; B60C 23/0493; B60C 23/0416; B60C 23/061; B60C 23/0433; B60C 19/00; B60C 23/04; B60C 23/041; B60C 23/0444; B60C 23/0452; B60C 23/0413; B60C 23/0479; B60C 23/04985; B60C 23/0488; B60C 23/062; B60C 11/24; B60C 23/0442; B60C 23/045; B60C 23/0462;

(Continued)

(56) References Cited

U.S. PATENT DOCUMENTS

2007/0069877 A1    3/2007  Fogelstrom
2011/0071737 A1    3/2011  Greer et al.
(Continued)

FOREIGN PATENT DOCUMENTS

CN    108248303 A   *  7/2018   ......... B60C 23/0416
DE   102010006178 A1 *  8/2011   ........... B60C 23/061
(Continued)

OTHER PUBLICATIONS

International Search Report issued in related application Serial No. PCT/US2020/047603 dated Jan. 14, 2021.

*Primary Examiner* — Andre J Allen
(74) *Attorney, Agent, or Firm* — Mark H. Whittenberger, Esq.; Holland & Knight LLP

(57) ABSTRACT

A sensing system for a vehicle includes wheel end sensors (WES), each WES proximate to at least one predetermined tire and configured to sense angular data, including at least one of angular position, angular velocity, angular acceleration, and/or angular displacement. The system includes a plurality of tire pressure monitoring (TPM) sensors, each TPM sensor inside one of the tires and configured to sense pressure, temperature, and angular data within said tire. The sensing system is configured to compare the angular data sensed by each WES to the angular data sensed by each TPM sensor to automatically identify, for each TPM sensor, a corresponding WES, and based on the position on the vehicle of the predetermined tire of the corresponding WES, identify the position on the vehicle corresponding to said TPM sensor.

18 Claims, 4 Drawing Sheets

(58) Field of Classification Search
CPC ..... B60C 23/20; B60C 25/002; B60C 11/243; B60C 23/0411; B60C 23/06; B60C 23/064; B60C 23/066; B60C 11/246; B60C 17/00; B60C 2019/004; B60C 23/00318; B60C 23/00354; B60C 23/00372; B60C 23/004; B60C 23/02; B60C 23/0415; B60C 23/0455; B60C 23/0471; B60C 23/0489; B60C 29/02; B60C 9/02; B60C 11/0318; B60C 2019/005; B60C 2019/006; B60C 23/00; B60C 23/006; B60C 23/008; B60C 23/0401; B60C 23/0432; B60C 23/0459; B60C 23/0481; B60C 23/0484; B60C 23/0491; B60C 23/0498; B60C 25/00; B60C 25/0554; B60C 29/06; B60C 29/064; B60C 29/066; B60C 99/006; B60C 11/00; B60C 11/13; B60C 13/00; B60C 13/001; B60C 17/02; B60C 17/04; B60C 17/041; B60C 2200/02; B60C 23/00345; B60C 23/00363; B60C 23/007; B60C 23/0405; B60C 23/0406; B60C 23/0425; B60C 23/044; B60C 23/0447; B60C 23/0449; B60C 23/0454; B60C 23/0466; B60C 23/0472; B60C 23/0474; B60C 23/0476; B60C 23/0483; B60C 23/0486; B60C 23/126; B60C 23/131; B60C 25/005; B60C 25/0503; B60C 25/132; B60C 25/142; B60C 25/16; B60C 29/005; B60C 29/04; B60C 5/004; B60C 5/14; B60C 9/18; G01M 17/022; G01M 17/027; G01M 17/021; G01M 17/013; G01M 17/06; G01M 1/02; G01M 1/326; G01M 17/0072; G01M 17/0074; G01M 17/024; G01M 17/025; G01M 17/028; G01M 17/045; G01M 17/08; G01M 17/10

USPC .................................................. 73/146–146.8
See application file for complete search history.

(56) References Cited

U.S. PATENT DOCUMENTS

| | | |
|---|---|---|
| 2011/0304442 A1 | 12/2011 | Lickfelt et al. |
| 2013/0061456 A1 | 3/2013 | Lefaure et al. |
| 2016/0129736 A1* | 5/2016 | Peine ........................ G01B 7/30 |
| | | 701/32.3 |
| 2017/0276570 A9 | 9/2017 | White et al. |
| 2020/0255065 A1* | 8/2020 | Tsujita ................ B60C 23/0415 |
| 2020/0346500 A1* | 11/2020 | Zeng ................... B60C 23/0462 |

FOREIGN PATENT DOCUMENTS

| | | | | |
|---|---|---|---|---|
| DE | 112012005694 B4 | * | 11/2021 | ......... B60C 23/0415 |
| FR | 3113863 A1 | * | 3/2022 | |
| KR | 20160128572 A | * | 11/2016 | |

* cited by examiner

POSITION SENSING SYSTEM AND METHOD FOR LOCATING TIRE PRESSURE MONITORING SENSORS USING CORRELATION TO WHEEL END SENSORS

FIELD OF THE TECHNOLOGY

The subject disclosure relates to sensing technology and more particularly to sensing systems and methods for vehicle tire pressure.

BACKGROUND OF THE TECHNOLOGY

Many vehicle tires include Tire Pressure Monitoring (TPM) sensors which measure and wirelessly report information such as tire pressure and temperature. Information reported by the TPM sensors is often then received by one or more wireless receivers, which can be part of a central electronic control unit (ECU) on the vehicle. That information is processed to determine what output should be passed on to the driver. This typically results in a low tire pressure warning being displayed for the driver.

Unfortunately, vehicles are usually unable to differentiate between TPM sensors and their positions, and therefore unable to alert the user as to which tire is affected or needs to be repaired. This can prove particularly problematic in cases where the vehicle has many wheels. Some tractor trailers, for example, can have 18 or more wheels. Therefore even after receiving a low tire pressure warning, it can take a significant amount of time and effort to hone in on a particular tire which requires air, or may have a defect. Other existing solutions to this problem tend to rely on information available on the vehicle information network that is inefficient due to inaccurate data, data with variable delays, data that is difficult to interpret and integrate, data that is not always available, or the like.

SUMMARY OF THE TECHNOLOGY

Therefore there is a need for a simplified system and method that accurately identifies a position of a tire that has low pressure.

In at least one aspect, the subject technology relates to a sensing system for a vehicle having a plurality of tires, each tire having a position on the vehicle. The system includes a plurality of wheel end sensors (WES), each WES proximate to at least one predetermined tire of the tires and having a sensor configured to sense angular data at said at least one predetermined tire. Each WES includes a transceiver configured to wirelessly communicate. In some cases, the WES can wirelessly communicate with an electronic control unit (ECU) of the vehicle. The system includes a plurality of tire pressure monitoring (TPM) sensors, each TPM sensor inside one of the tires and configured to sense pressure, temperature, and angular data within said tire. Each TPM sensor includes a transceiver configured to wirelessly communicate. In some cases, the TPM sensors can wirelessly communicate with the ECU. The sensing system is configured to compare the angular data sensed by each WES to the angular data sensed by each TPM sensor to automatically identify, for each TPM sensor, a corresponding WES. Based on the position on the vehicle of the predetermined tire of the corresponding WES, the system identifies the position on the vehicle corresponding to said TPM sensor.

In some embodiments, the sensing system can include the ECU and the ECU is configured to compare the angular velocity sensed by each WES to the angular velocity sensed by each TPM sensor. The system can include a display in communication with the ECU of the vehicle and the ECU can be configured to identify a warning condition based on the pressure or temperature sensed by one of the TPM sensors. A warning can be indicated on the display which includes the position of said tire based on the WES corresponding to said tire.

In some embodiments, each WES is mounted on a wheel hub corresponding to the predetermined tire of said WES. In some embodiments, each WES is mounted on an axle extending between at least two of the tires of the tires. In some embodiments, each WES is configured to pair with a diagnostic device (e.g. through near field communication or another method) to discover an identification (ID) of said WES, the same, or another diagnostic device configured to communicate with an electronic control unit (ECU) of the vehicle to communicate the position of the predetermined tire proximate to each WES to the ECU.

In some embodiments the angular data sensed by each WES and by each TPM sensor includes angular velocity and the sensing system is configured to compare an angular velocity sensed by each WES to an angular velocity sensed by each TPM sensor to automatically identify, for each TPM sensor, the corresponding WES. In some cases, based on the angular velocity sensed, each TPM sensor and WES can selectively operate in a low power mode, adapting lower sampling and transmission rates.

In some embodiments, the angular data sensed by each WES and by each TPM sensor can include angular velocity and the sensing system is configured to compare an averaged angular velocity sensed by each WES over a time period to the averaged angular velocity sensed by each TPM sensor over the time period to automatically identify, for each TPM sensor, the corresponding WES. In some cases, the angular data sensed by each WES and by each TPM sensor includes angular displacement and the sensing system is configured to compare an angular displacement sensed by each WES over a time period to the angular displacement sensed by each TPM sensor over the time period to automatically identify, for each TPM sensor, the corresponding WES. In some embodiments, the sensor of each WES is an accelerometer configured to sense angular data or a shock sensor configured to sense vibration and/or angular data.

In some embodiments, the WES and TPM sensors are configured to wirelessly communicate such that each WES receives transmissions from at least one of the TPM sensors. Each WES can then be further configured to compare received signal strength indications between WES and TPM sensors to automatically identify, for each TPM sensor, the corresponding WES.

In some cases, the ECU can be configured to compare the angular data sensed by each WES to the angular data sensed by each TPM sensor. The ECU can then indicate a tire pressure alert when the pressure sensed by one of the TPM sensors is below a threshold, the tire pressure alert identifying the position on the vehicle corresponding to said TPM sensor.

In some embodiments, the angular data sensed by each WES and each TPM sensor comprises one or more of the following: angular position data; angular displacement data; angular velocity data; and/or angular acceleration data. In some embodiments, the sensing system is further configured to compare angular data sensed by each WES over a time period to angular data sensed by each TPM sensor over the time period to automatically identify, for each TPM sensor, the corresponding WES.

BRIEF DESCRIPTION OF THE DRAWINGS

So that those having ordinary skill in the art to which the disclosed system pertains will more readily understand how to make and use the same, reference may be had to the following drawings.

DETAILED DESCRIPTION

Figure 1:
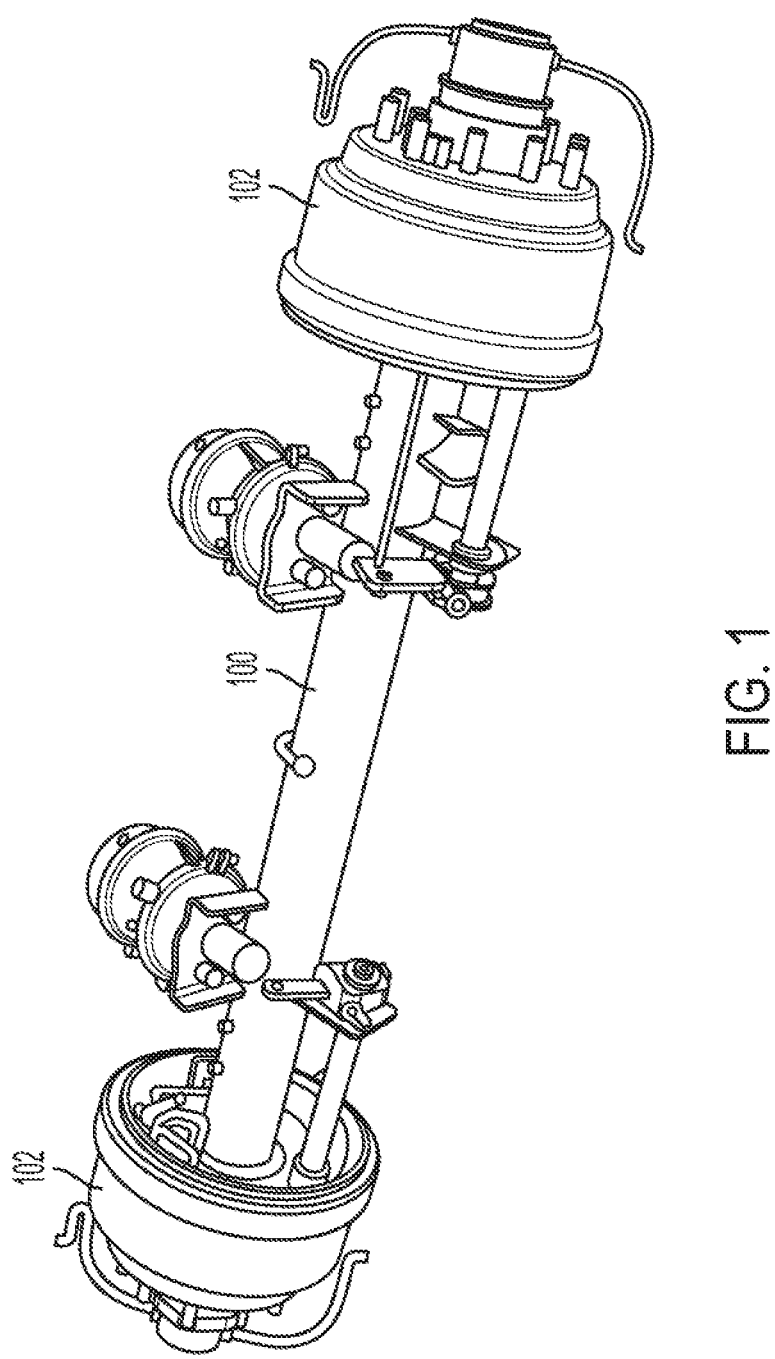
FIG. 1 is a schematic diagram of a wheel axle which can be used to incorporate sensing technology in accordance with the subject technology.

The subject technology overcomes many of the prior art problems associated with sensing tire pressure in vehicles. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be on top).

Referring now to FIG. 1, an axle 100 for a vehicle is shown. Wheel hubs 102 are connected at either end of the axle 100 for attaching wheels (not shown). In accordance with the subject technology, each wheel attached to the axle will include a tire pressure monitoring (TPM) sensor disposed within it. Each TPM sensor measures tire pressure and temperature of a corresponding tire. Each TPM sensor also measures angular data, which can include angular position, angular displacement, angular velocity, and/or angular acceleration.

Wheel end sensors (WES) can also be included proximate to one of the wheels. The WES are typically either attached to the axle 100 in such that the WES are directly adjacent to a wheel, or attached directly to the wheel, such as by attachment to the wheel hub 102 or by attachment to a wheel bearing connected to the wheel hub 102. Each WES is also configured to measure angular data, and is particularly configured to measure at least some of the same angular data as the TPM sensors. For example, the WES can be configured to measure angular position, angular displacement, angular velocity, and/or angular acceleration, in accordance with the angular data being measured by the TPM sensors, as discussed in more detail below. Each WES may be installed in a position on the vehicle proximate to at least one predetermined tire, the positioning information programmed or relayed to a processing and communication unit, TPM, or another WES on the vehicle.

Figure 2:
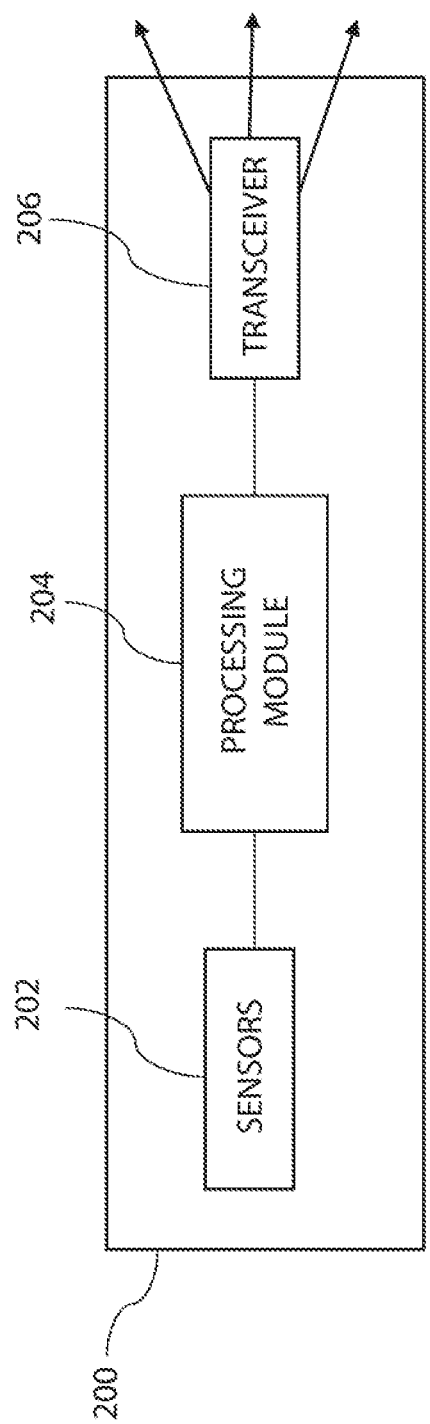
FIG. 2 is a block diagram of a wheel end sensor in accordance with the subject technology.

Referring now to FIG. 2, a block diagram shows the components of a WES 200 in accordance with the subject technology. The WES 200 includes one or more individual sensors 202 for measuring angular data, including at least, angular position, angular velocity, angular acceleration, and/or angular displacement which can be used by the vehicle in a number of different ways. For example, the sensors 202 can include an accelerometer, the WES 200 configured to measure angular velocity with the accelerometer to provide data on angular velocity to the vehicle. Based on the measured angular velocity, the WES 200 can also determine whether or not the vehicle is moving and adjust its own behavior accordingly, such as by adapting sampling rates and transmission rates. Additionally, or alternatively, the sensors 202 can include a shock sensor configured to sense vibration and angular velocity. The shock sensors can likewise determine when the angular velocity is above a certain threshold to allow the WES 200 to modify its behavior accordingly. The sensors 202 also include other sensors for measuring wheel end conditions such as wheel bearing condition or health, temperature, noise, and/or vibration (or accelerometers and/or shock sensors can be used to measure wheel end conditions). The sensors 202 communicate measured data to a processing module 204. The processing module 204 generally includes the necessary components for processing and storing information, and can include a microprocessor, an application specific integrated circuit, and/or other components necessary for carrying out the functions described herein. The processing module 204 can process data from the sensors 202 before sending the processed data to the transceiver 206.

The transceiver 206 wirelessly transmits and receives data between the WES and other processors of the sensing system or vehicle. Wireless communication can be through RF, Bluetooth, or other known wireless transmission methods. The transceiver 206 typically receives processed data from the processing module 204 and transmits the data to other components of the vehicle, such as other WES on the vehicle, a central Electronic Control Unit (ECU) for the vehicle, or a wireless hub or wireless gateway that are part of a wireless vehicle network. The transceiver 206 can also receive data from the devices it communicates with, sending the received data to the processing module 204. In some cases, the WES 200 includes only a transmitter, rather than a transceiver 206 which can transmit or receive.

Figure 3:
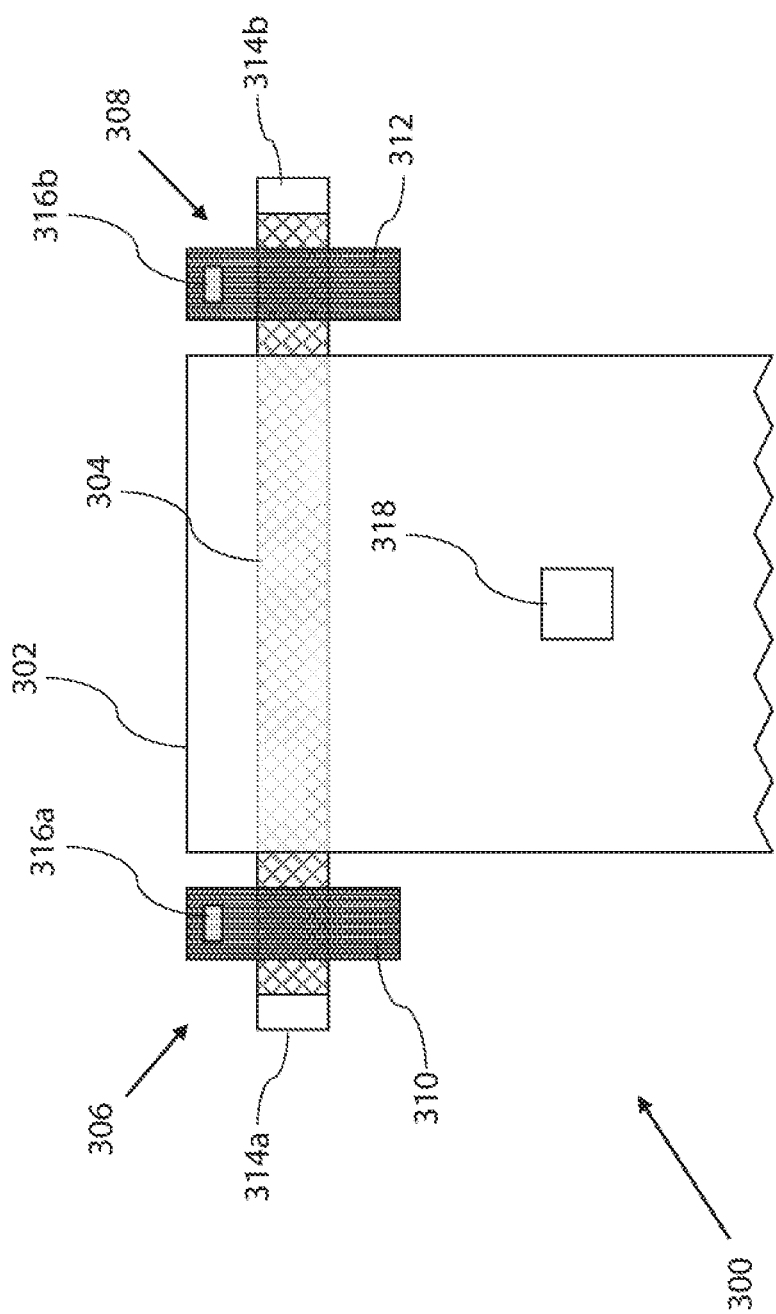
FIG. 3 is a block diagram of vehicle components incorporating a sensing system in accordance with the subject technology.

Referring now to FIG. 3, a block diagram of vehicular component parts incorporating a sensing system in accordance with the subject technology is shown generally at 300. The vehicle 302 includes a vehicle axle 304. The axle 304 extends between a left side 306 of the vehicle 302 and a right side 308 of the vehicle 302. In the exemplary embodiment shown, the axle 304 is a front axle of the vehicle 302, although it should be understood that, in accordance with the subject technology, each axle of the vehicle will be configured similar to the axle 304 shown in FIG. 3 and described herein. The axle 304 is connected to a left side wheel 310 and a right wheel 312 on either end of the axle 304, each wheel including a tire (not shown distinctly). The axle 304 and wheels 310, 312 bear the weight of the vehicle 302 and the axle 304 is sometimes used transmit torque to the wheels 310, 312 in order to drive the vehicle 302. Since the axle 304 is positioned at the front of the vehicle 302, the wheels 310, 312 (and tires) are similarly considered front wheels, and are positioned at front left and front right positions of the vehicle 302, respectively. While two wheels 310, 312 are shown in FIG. 3, the number of wheels on each axle can vary greater depending on the vehicle type, although the sensing system can still be configured as described herein. For example, a given axle may be a tractor trailer axle and may include four or more wheels, while a motorcycle may include only a single wheel. It should be understood, therefore, that while two wheels 310, 312 on an axle are shown by way of example, the subject technology is equally applicable to vehicles using axles with different numbers of wheels on each axle.

The sensing system includes two WES 314a, 314b (generally 314) and two TPM sensors 316a, 316b (generally 316). Each TPM sensor 316 is positioned at a location on the vehicle corresponding with one of the wheels 310, 312, and is particularly disposed within the wheel tire of one of the wheels 310, 312 to measure air pressure and temperature within the tire. Each TPM sensor 316 is further configured to measure other characteristics, including angular data. Angular data relates to at least one of the following: angular position, angular displacement, angular velocity, and angular acceleration. TPM sensors 316 are included in all tires on vehicles with a sensing system in accordance with the subject technology. As described above with respect to the WES 200, the TPM sensors 316 can also include processing modules and transceivers (or just a transmitter) to communicate wirelessly with an ECU 318 of the vehicle 302. Since most wheels come with a built in TPM sensor, the ECU 318 is typically programmed to automatically wirelessly sync up with local TPM sensors 316 and begin receiving data from the TPM sensors 316. Additionally, the ECU 318 can at times potentially receive transmissions from TPM sensors of other vehicles (not shown distinctly herein). The ECU 318 includes logic and/or criteria to discriminate between the signals received from TPM sensors 316 for the correct vehicle 302, and signals received from TPM sensors of other vehicles, which are discarded and not used. Based on the data transmitted from the TPM sensors 316, the ECU 318 can provide a warning to the driver of the vehicle 302 (e.g., by illuminating a low tire pressure tell-tale) to warn them of a potentially problematic condition, such as a low tire pressure warning when one or more of a vehicle's 302 tires are underinflated. Similarly, the TPM sensor 316 can report on other measured conditions, such as tire temperature, for example. In accordance with the subject technology, and as discussed in more detail below, the sensing system of the present disclosure can also identify the position of each TPM sensor 316, so any reported condition can be traced to a specific position on the vehicle 302.

Two WES 314 are also included attached on the very ends of the axle 304, one at a front-left position (314a) proximate to the front-left wheel 310 and tire, and a second WES at a front-right position (314b) proximate to the front-right wheel 312 and tire. In the example shown, the WES 314 are connected to the axle 304 at outmost positions via mounting to wheel hubs. In other cases, the WES 314 can be mounted directly to the axle 304 proximate to one of the wheels. The WES 314 may be designed similar to the WES 200 described above to measure angular data, process data, and transmit data to the ECU 318 of the vehicle 302.

While the TPM sensors 316 are normally included within wheels 310, 312, the WES 314 are placed on the vehicle 302 (i.e. on the wheels 310, 312 or axle 304) by a technician proximate to a predetermined tire or wheel 310, 312. Each WES 314 typically has a preprogrammed WES ID identifier which can be stored on the processing module of the WES 314. Alternatively, in some cases, the WES ID can be indicated in other ways, such as by a simple label on, or included with, the WES 314. As the technician places the WES 314, the technician discovers (or otherwise identifies) the WES ID for the WES 314 being placed. The technician can do this by using a smartphone, or a more particular diagnostic tool configured for this purpose. The device (not shown) is normally configured to pair with each WES 314 using near field communication to wirelessly communicate. Other communications can also be utilized, such as Bluetooth or Wi-Fi. The WES 314 then syncs up with ECU 318 for wireless communication. Likewise, the diagnostic tool or smartphone syncs up with the ECU 318 for wireless communication through any of the aforementioned wireless communication methods (or, in some cases, the diagnostic tool can sync with the ECU 318 through a wired connection). The technician then inputs the position on the vehicle 302 of the WES 314 associated with each WES ID based on the position of the tire proximate to the WES 314. For example, the technician would input the front-left position 306 for the front-left WES 314a and front-right position 308 for the front-right WES 314b. Therefore, as data from the sensors on each WES 314 is transmitted to the ECU 318, the ECU 318 recognizes a position on the vehicle 302 for all incoming measured data from the WES 314 based on the predetermined positions of the WES 314, as entered by the technician.

As the vehicle 302 and wheel 310, 312 move, the TPM sensors 316 and WES 314 corresponding to similar positions on the vehicle 302 should experience the same, or substantially the same, forces which are reported to the ECU 318 through the measured angular data (i.e., the same angular displacement, angular velocity, or angular acceleration). At different positions on the vehicle 302, the TPM sensors 316 and WES 314 will have distinguishable angular data for the TPM sensors 316 and WES 314 at other positions on the vehicle 302. The ECU 318 is configured to compare the angular data sensed by each WES 314 to the angular data sensed by each TPM sensor 316 to automatically identify, for each TPM sensor 316, a corresponding WES 314 based on similar angular data. Since the ECU 318 is aware of the positions of each WES 314 from the position on the vehicle 302 of the predetermined tire of the corresponding WES 314 and as entered by the technician, the ECU 318 can identify the position on the vehicle 302 corresponding to each TPM sensor 316 by matching up angular data reported by each TPM sensor 316 with angular data reported by a WES 314. Thus, position of TPM sensors 316 on the vehicle 302 can be discovered by correlating TPM sensor 316 angular data to WES 314 angular data since the position of each WES 314 is known.

This correlation can be done completely or partially by the ECU 318 through an autolocation algorithm, or in a separate processor otherwise connected to the vehicle network. The correlation of TPM sensor 316 angular data to WES 314 angular data for identifying corresponding TPM sensors 316 and WES 314 can be accomplished by comparing one or more specific types of angular data in various ways. For example, in some cases the ECU 318 compares the angular velocity sensed by each WES 314 to the angular velocity sensed by each TPM sensor 316, and the WES 314 and TPM sensors 316 are correlated. This can be done by comparing instantaneous angular velocity, or alternatively, the ECU 318 can consider angular velocity received by each WES 314 and by each TPM sensor 316 over a given time period. In some cases, a time period of less than 10 minutes has been found to be effective and advantageous. The ECU 318 will then average the angular velocity sensed by each WES 314 and TPM sensor 316 over the time period and match up WES 314 and TPM sensors 316 with the most similar averaged angular velocity. Each WES 314 and each TPM sensor 316 can also be configured, optionally, to operate in a low power mode based on the measured angular velocity, and particularly when the measured angular velocity is very low or substantially zero indicating a slowly moving or stationary vehicle 302. In the low power mode, the WES 314 and the TPM sensors 316 employ lower sampling and transmission rates to conserve energy, since completely up to date information from the sensors is less needed by the vehicle 302 at that time.

In other cases, the comparison of angular data can be done between other types of angular data measured by the sensors 314, 316. For example, angular position, angular displacement, and/or angular acceleration could be relied upon, rather than angular velocity. In such a case, the ECU 318 can average angular position, angular displacement, and/or angular acceleration over a given time of each WES 314 and each TPM sensor 316 to find which WES 314 corresponds to which TPM sensor 316.

In other cases, each TPM sensor 316 may also transmit data directly to one or more WES 314 and the data can then be processed on the WES 314. Each WES 314 can then compare received signal strength indicators (RSSI). For each WES 314, the TPM sensor 316 with the strongest RSSI is considered to be the closest, and therefore the corresponding sensor (proximate to the same tire and position on the vehicle 302). Therefore, when RSSIs are utilized, the correlation of angular data from WES 314 and TPM sensor 316 may not be needed, but can be done for redundancy.

Once a correlation is made between WES 314 and TPM sensor 316, the ECU 318 can provide a specific indication to the user of the position on the vehicle 302 of various conditions based on the sensed data. For example, the TPM sensors 316 measure data including tire pressure, and will accordingly provide data when a tire of one of the wheels 310, 312 has crossed a low pressure threshold, making a low pressure warning necessary. Since the ECU 318 now knows a position on the vehicle 302 for each TPM sensor 316, the ECU 318 will also know the position of a tire with low pressure based on the data reported from the TPM sensors 316. Thus, rather than indicate a simple "low pressure" alert to the user, the ECU 318 can indicate specifically where on the vehicle 302 the tire with low pressure is. In addition to identifying the location of the tire for the user, this allows the system to provide appropriate warnings related to that location, such as when the recommended pressure is different between different axles. It should be understood that while a single axle 304 with two wheels 310, 312, two WES 314, and two TPM sensors 316 are shown, the subject technology is equally able to be carried out in accordance with any number of these features as are included on a given vehicle.

Figure 4:
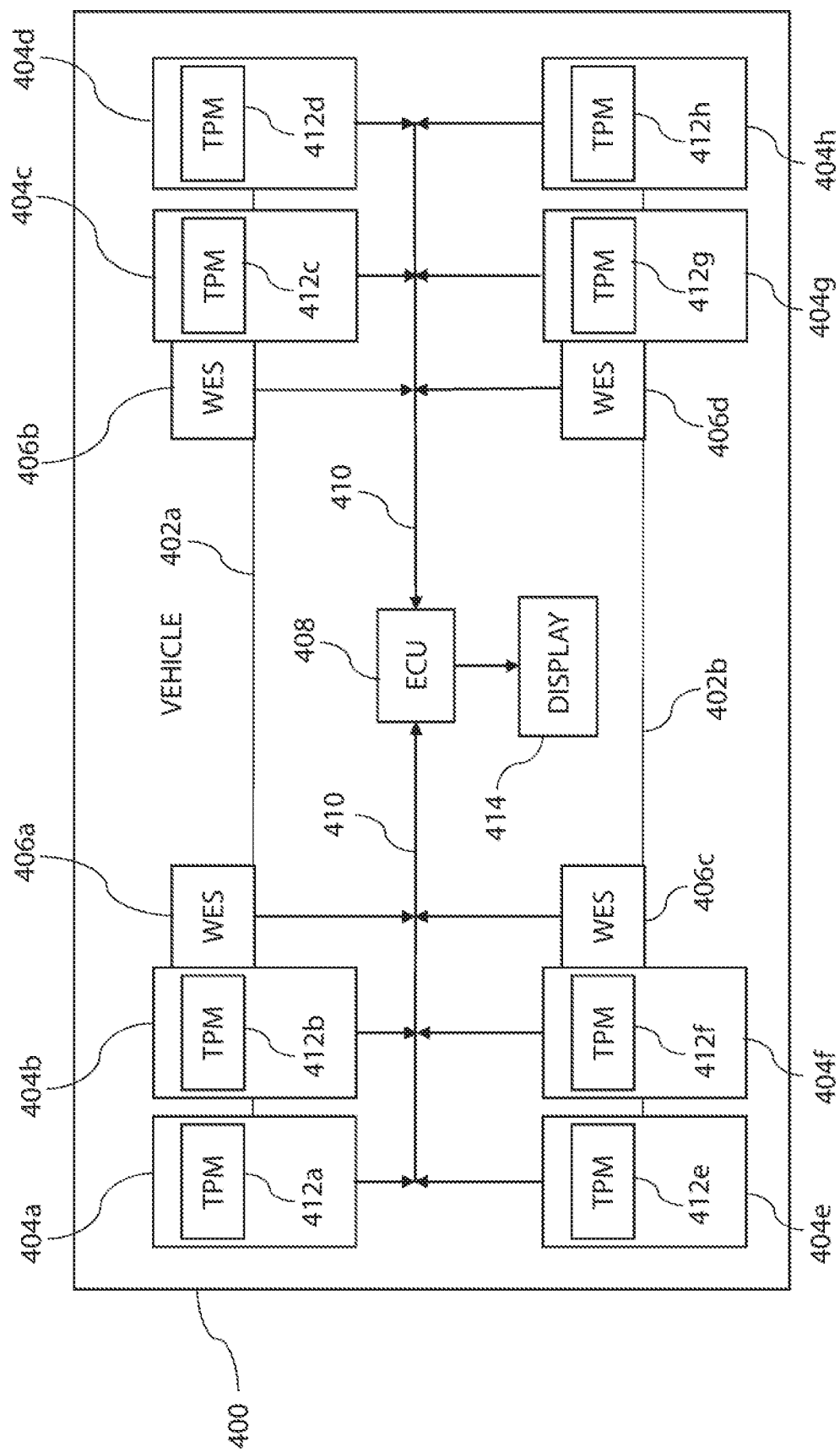
FIG. 4 is a block diagram of vehicle components incorporating a sensing system in accordance with the subject technology.

To that end, referring now to FIG. 4, a block diagram showing a vehicle 400 with axles 402a, 402b (generally 402) each having multiple paired wheels 404a-404h (generally 404) in accordance with the subject technology is shown. In the example of FIG. 4, two axles 402 are shown, each with two wheels 404 on opposing ends. One WES 406a-406d (generally 406) is proximate to each pair of wheels 404, and proximate to a corresponding position on the vehicle 400. For example, a first WES 406a is proximate to the wheels 404a, 404b in the front-left position, the second WES 406b is proximate to the wheels 404c, 404d in the front-right position, the third WES 406c is proximate to the wheels 404e, 404f in the rear-left position, and the fourth WES 406d is proximate to the wheels 404g, 404h in the rear-right position. Each WES 406 is in wireless electrical communication with the ECU 408 through a vehicle network 410. A TPM sensor 412a-412h (generally 412) is included within the tire of each wheel 404, the TPM sensors 412 likewise communicating with the ECU 408 through the vehicle network 410. The ECU 408 is connected to a display 414, which can be a display monitor or other vehicle dashboard output for displaying warnings and other information to a driver. The WES 406 and TPM sensors 412 are generally configured in accordance with the other WES and TPM sensors described herein, except as otherwise described specifically. As such, the WES 406 and TPM sensors 412 measure angular data, among other things.

In this case, since there are multiple tires and TPM sensors 412 next to each WES 406, the angular data of each WES 406 will match, or be similar to, the angular data of two TPM sensors 412. Thus, when the measured angular data of WES 406 and TPM sensors 412 are compared, two TPM sensors 412 will be identified as corresponding to each WES 406. When a warning condition is present, such as low tire pressure, a warning can then be provided to the user, via the display, to indicate the general position (e.g. the axle-end) where the condition is occurring. Alternatively, further logic can be used to determine the position of the condition relative to the wheel, such as whether the condition is on the inner wheel or outer wheel.

For example, if a TPM sensor 412 detects a tire pressure below a certain threshold, indicating that the tire has a low pressure, the TPM sensor 412 can send raw measured data to the ECU 408 and the ECU 408 can determine when the pressure is lower than a threshold value (or alternatively, the TPM sensor 412 can send a warning to the ECU 408). The ECU 408 identifies that this is a warning condition which needs to be reported to the user. Thus, through the display 414 the ECU 408 can indicate a low tire pressure warning to the user. Further, since the TPM sensor 412 can be correlated to a WES 406 based on the measured angular data, as described above, and the position of the WES 406 is known, the ECU 408 can determine the position on the vehicle of the TPM sensor 412 reporting low tire pressure. Thus, the warning indicated on the display 414 can specifically identify the position of the warning condition. For example, assuming the wheels 404a, 404b are on a front-left position on the vehicle 400, if one of the TPM sensors 412a, 412b reports the warning condition, the ECU 408 would determine that the warning is coming from a front-left position based on the correlation of the TPM sensors 412a, 412b with the WES 406a (the position of the WES 406a being known). In this way, the system has narrowed the tires down to the two tires corresponding to the wheels 404a, 404b which may potentially have low pressure. The user then only needs to inspect the two front-left wheels 404a, 404b to discover which tire has low pressure, saving them time and potentially significant cost if they were to replace a healthy tire. Notably, while the embodiment shown herein has 8 total wheels 404 with corresponding tires, in the case where the vehicle has an even larger number of wheels, such as an eighteen wheeler tractor trailer, the savings in terms of convenience and cost can be even greater.

It will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements (e.g., processors, sensors, transmitters, and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A sensing system for a vehicle having a plurality of tires, each tire having a position on the vehicle, comprising:
   a plurality of wheel end sensors, each wheel end sensor at a position on the vehicle proximate to at least one predetermined tire of the tires and having a sensor configured to sense angular data at said at least one predetermined tire, each wheel end sensor including a transceiver configured to wirelessly communicate with an electronic control unit (ECU) of the vehicle; and
   a plurality of tire pressure monitoring (TPM) sensors, each TPM sensor inside one of the tires and configured to sense pressure, temperature, and angular data within said tire, each TPM sensor including a transceiver configured to wirelessly communicate with the ECU,
   wherein the sensing system is configured to compare the angular data sensed by each wheel end sensor to the angular data sensed by each TPM sensor to automatically identify, for each TPM sensor, a corresponding wheel end sensor, and based on the position on the vehicle of the predetermined tire of the corresponding wheel end sensor, identify the position on the vehicle corresponding to said TPM sensor.

2. The system of claim 1, further comprising the ECU, wherein the ECU compares angular velocity data sensed by each wheel end sensor to angular velocity data sensed by each TPM sensor.

3. The system of claim 1, further comprising a display in communication with the ECU of the vehicle, wherein:
   the ECU is configured to identify a warning condition based on the pressure or temperature sensed by one of the TPM sensors; and
   a warning is indicated on the display which includes the position of said tire based on the position of the wheel end sensor corresponding to said tire.

4. The system of claim 1, wherein the angular data sensed by each wheel end sensor and each TPM comprises one or more of the following: angular position data; angular displacement data; angular velocity data; and angular acceleration data.

5. A sensing system for a vehicle having a plurality of tires, each tire having a position on the vehicle, comprising:
   a plurality of wheel end sensors, each wheel end sensor proximate to at least one predetermined tire of the tires and having a sensor configured to sense angular data at said at least one predetermined tire, each wheel end sensor including a transceiver configured to wirelessly communicate; and
   a plurality of tire pressure monitoring (TPM) sensors, each TPM sensor inside one of the tires and configured to sense pressure, temperature, and angular data within said tire, each TPM sensor including a transceiver configured to wirelessly communicate,
   wherein:
   the sensing system is configured to compare the angular data sensed by each wheel end sensor to the angular data sensed by each TPM sensor to automatically identify, for each TPM sensor, a corresponding wheel end sensor, and based on the position on the vehicle of the predetermined tire of the corresponding wheel end sensor, identify the position on the vehicle corresponding to said TPM sensor.

6. The system of claim 5, wherein each wheel end sensor is mounted on a wheel hub corresponding to the predetermined tire of said wheel end sensor.

7. The system of claim 5, wherein each wheel end sensor is mounted on an axle extending between at least two of the tires.

8. The system of claim 5, wherein each wheel end sensor is configured to pair with at least one diagnostic device to discover an identification (ID) of said wheel end sensor, one of the at least one diagnostic devices further configured to communicate with an electronic control unit (ECU) of the vehicle to communicate the position of the predetermined tire proximate to each wheel end sensor to the ECU.

9. The system of claim 5, wherein the angular data sensed by each wheel end sensor and by each TPM sensor includes angular velocity data and the sensing system is configured to compare angular velocity data sensed by each wheel end sensor to angular velocity data sensed by each TPM sensor to automatically identify, for each TPM sensor, the corresponding wheel end sensor.

10. The system of claim 5, wherein the angular data sensed by each wheel end sensor and by each TPM sensor includes angular velocity data and the sensing system is configured to compare an averaged angular velocity sensed by each wheel end sensor over a time period to an averaged angular velocity sensed by each TPM sensor over the time period to automatically identify, for each TPM sensor, the corresponding wheel end sensor.

11. The system of claim 5, wherein the angular data sensed by each wheel end sensor and by each TPM sensor includes angular displacement data and the sensing system is configured to compare angular displacement data sensed by each wheel end sensor over a time period to angular displacement data sensed by each TPM sensor over the time period to automatically identify, for each TPM sensor, the corresponding wheel end sensor.

12. The system of claim 9, wherein the sensor of each wheel end sensor is an accelerometer configured to sense angular data.

13. The system of claim 5, wherein the sensor of each wheel end sensor is a shock sensor configured to sense vibration and angular data.

14. The system of claim 5, wherein:
   the wheel end sensor and TPM sensors are configured to wirelessly communicate such that each wheel end sensor receives transmissions from at least one of the TPM sensors; and
   each wheel end sensor is further configured to compare received signal strength indications between wheel end sensor and TPM sensors to automatically identify, for each TPM sensor, the corresponding wheel end sensor.

15. The system of claim 5 further comprising an electronic control unit (ECU) configured to:
   compare the angular data sensed by each wheel end sensor to the angular data sensed by each TPM sensor; and
   indicate a tire pressure alert when the pressure or temperature sensed by one of the TPM sensors is below a threshold, the tire pressure alert identifying the position on the vehicle corresponding to said TPM sensor.

16. The system of claim 9, wherein, based on the angular velocity sensed, each TPM sensor and wheel end sensor can selectively operate in a low power mode, adapting lower sampling and transmission rates.

17. The system of claim 5, wherein the angular data sensed by each wheel end sensor and each TPM sensor comprises one or more of the following: angular position data, angular displacement data, angular velocity data, and/or angular acceleration data.

18. The system of claim 5, wherein the sensing system is further configured to compare angular data sensed by each wheel end sensor over a time period to angular data sensed by each TPM sensor over the time period to automatically identify, for each TPM sensor, the corresponding wheel end sensor.

* * * * *